Jan. 27, 1970  W. E. NACHTIGALL, JR  3,492,042
VEHICLE BODY
Filed Feb. 23, 1968  3 Sheets-Sheet 1
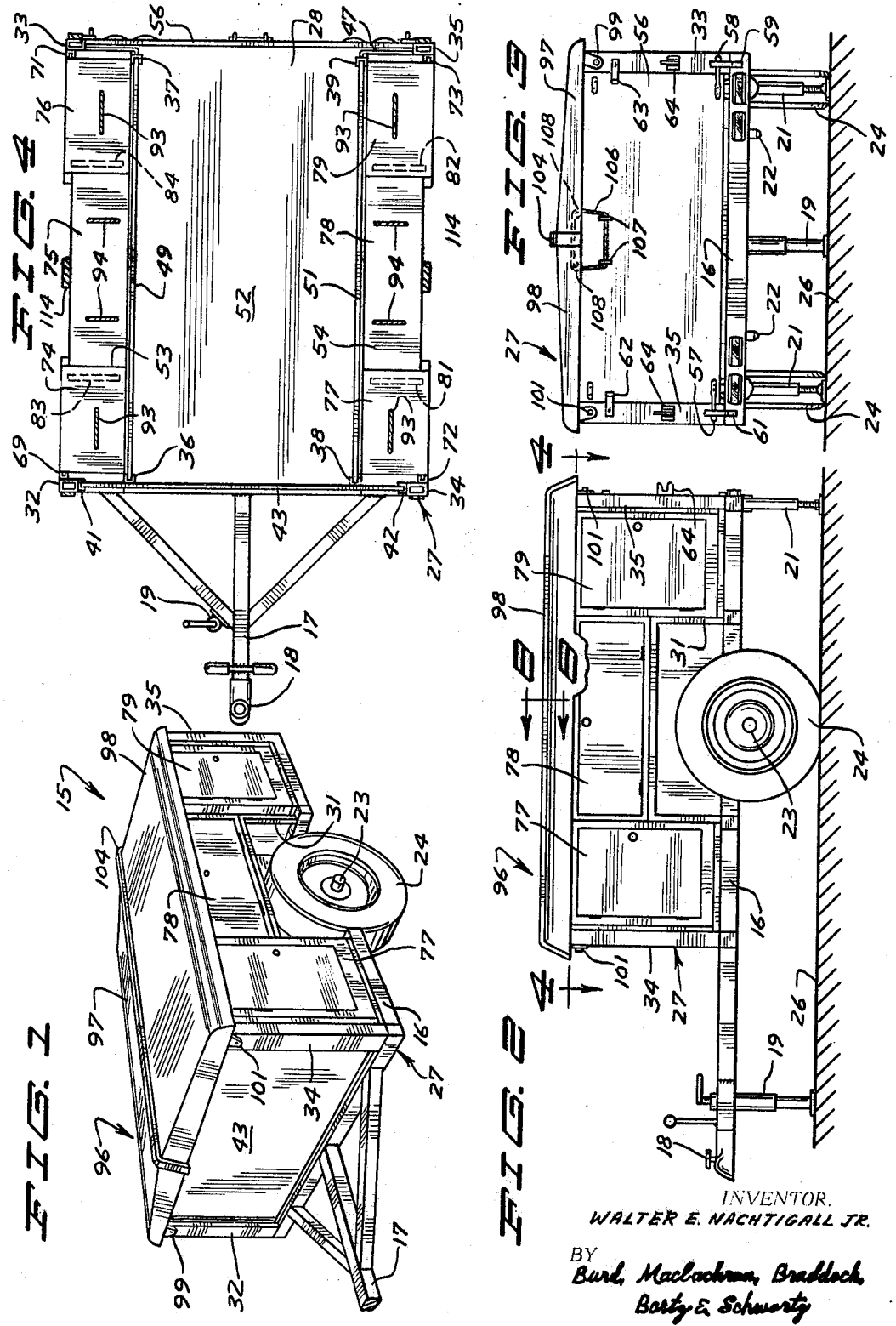
INVENTOR.
WALTER E. NACHTIGALL JR.
BY
Burd, Maclachlan, Braddock,
Bartz & Schwartz
ATTORNEYS Jan. 27, 1970  W. E. NACHTIGALL, JR  3,492,042
VEHICLE BODY
Filed Feb. 23, 1968  3 Sheets-Sheet 2
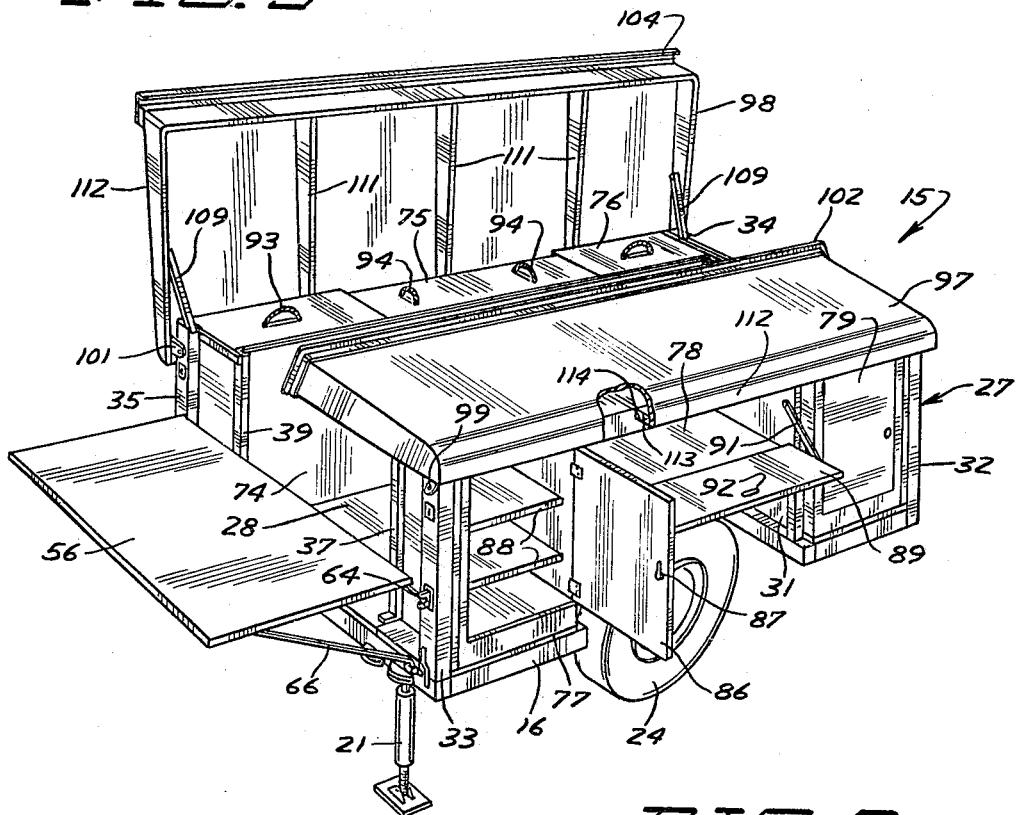
FIG. 5
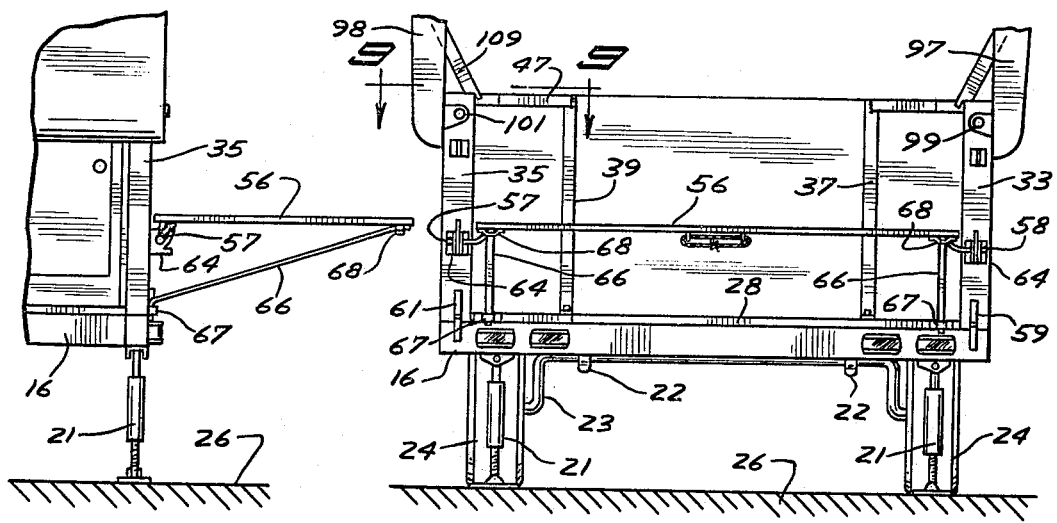
FIG. 6
FIG. 7
INVENTOR.
WALTER E. NACHTIGALL JR.
BY
Burd, MacEachron, Braddock,
Bartz & Schwartz
ATTORNEYS Jan. 27, 1970  W. E. NACHTIGALL, JR  3,492,042
VEHICLE BODY
Filed Feb. 23, 1968  3 Sheets-Sheet 3
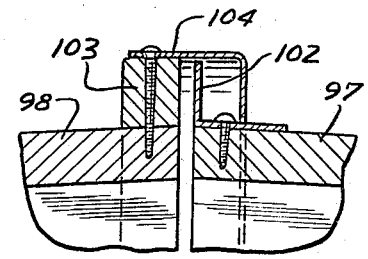
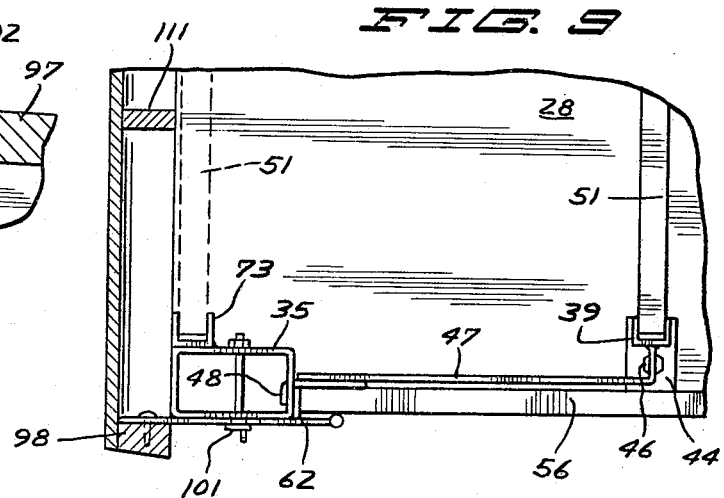
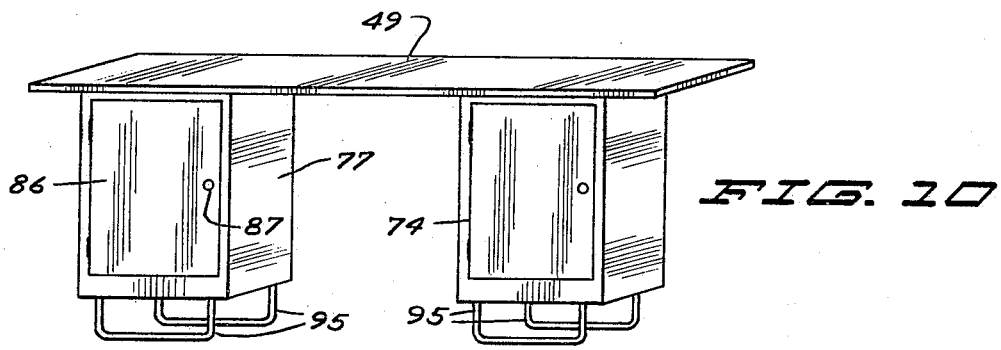
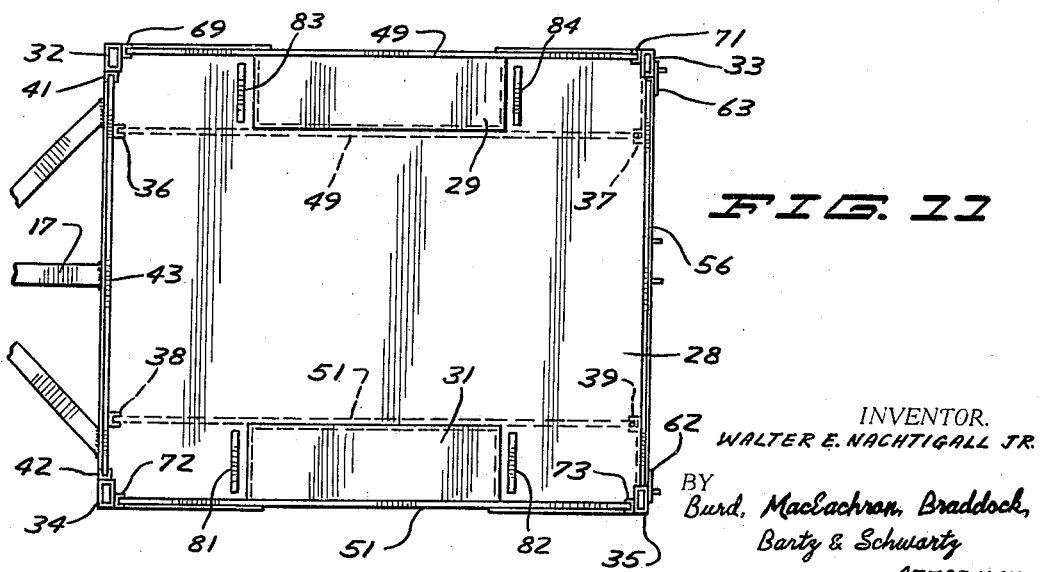
INVENTOR.
WALTER E. NACHTIGALL JR.
BY
Burd, MacEachron, Braddock,
Bartz & Schwartz
ATTORNEYS

United States Patent Office 3,492,042
Patented Jan. 27, 1970

---

3,492,042
VEHICLE BODY
Walter E. Nachtigall, Jr., 4468 Ellerdale Road,
Minnetonka, Minn. 55343
Filed Feb. 23, 1968, Ser. No. 707,683
Int. Cl. B62d 33/08
U.S. Cl. 296—24                                      11 Claims

ABSTRACT OF THE DISCLOSURE

A two-wheeled camping trailer convertible into a general utility trailer. The trailer has a frame supporting a floor, and wheel enclosing housings. Two pairs of first and second upright end posts for selectively receiving longitudinal upright side panels divide the trailer floor into a center cargo section and side cabinet carrying sections. The outer posts support a front bulk head and a tail gate. Located on the floor and on wheel housings adjacent the outsides of the panels are removable cabinets each having doors which open to the outside of the trailer without removing the cabinets from the trailer. Pivotally mounted on the outer posts are longitudinal folding covers which rotate down over the cabinets and cargo section to enclose the entire top of the trailer. The side panels can be moved into channel members secured to the outside posts to provide a general utility trailer.

BACKGROUND OF INVENTION

Tent camping requires considerable auxiliary equipment and a tent. This equipment must be loaded and unloaded from the transport vehicle, as an automobile, at the start of the camping trip and when new camp grounds are visited. At the end of the camping trip the equipment must be removed from the vehicle and stored. The object of the invention is to provide a trailer capable of holdnig all of the camping equipment as well as the supplies and the tent to eliminate the necessity of loading and unloading equipment, supplies and tent from the automobile. To provide for broader use of the trailer it is designed to be converted into a general purpose utility trailer with a minimum of time and effort. The small general purpose trailers presently utilized have box type bodies with swinging end gates. Removable canvas tops cover the camping gear and luggage located on the trailer bodies.

SUMMARY OF THE INVENTION

The invention relates broadly to a trailer body mounted on an axle assembly having wheels. The body has a frame carrying a floor. Secured to the frame generally at the corners of the frame are first upright corner posts spaced from second upright posts located laterally inwardly from the first posts. Longitudinal upright side members supported by the second posts divide the trailer body into a center cargo section and side sections. Removably located in the side sections are box or cabinet units resting on the floor adjacent the outside of the side members. Upright means on the floor prevent lateral outward movement of the box units so that the box units remain in place. The box units have outwardly opening doors which can be opened when the box units are located on the floor adjacent the side members making the interiors of the box units accessible without removing the box units from the trailer body. A cover is pivotally mounted on the first posts for closing the entire top of the trailer body. To convert the trailer to a general utility trailer the side members are inserted and held between the outside corner posts on each side of the trailer body. This removes the partitions between the center cargo carrying section and the side sections of the trailer body creating one large cargo carrying area.

In the drawings:
FIGURE 1 is a perspective view of the trailer of the invention;
FIGURE 2 is a side elevational view of the trailer of FIGURE 1;
FIGURE 3 is a clear elevational view of the trailer of FIGURE 1;
FIGURE 4 is a sectional view taken along ilne 4—4 of FIGURE 2;
FIGURE 5 is a perspective view of the trailer showing one cover open, supply boxes open, and tail gate mounted in a horizontal table position;
FIGURE 6 is a rear end elevational view of FIGURE 5 with both covers open;
FIGURE 7 is a side view of FIGURE 6 showing the rear of the trailer;
FIGURE 8 is an enlarged sectional view taken along the line 8—8 of FIGURE 2;
FIGURE 9 is an enlarged sectional view taken along line 9—9 of FIGURE 6;
FIGURE 10 is a perspective view of a pair of supply boxes and trailer side member set up as a bench or table; and
FIGURE 11 is a plan view of the trailer of FIGURE 1 converted into a general utility trailer.

Referring to the drawings there is shown in FIGURES 1 and 2 the trailer of the invention indicated generally at 15 having a generally horizontal skeleton frame 16. Secured to the forward portion of frame 16 is a tongue 17 having a hitch 18. An upright tongue jack 19 secured to the tongue holds the tongue and frame in a horizontal position. As shown in FIGURES 3 and 6, the rear portion of the frame has a pair of upright adjustable jacks 21 which are pivotally mounted on the opposite ends of the rear of the frame and engage supporting surface 26 to hold the trailer in a level position. During travel of the trailer jacks 21 are pivoted upwardly and engaᵣe holding brackets 22 secured to the bottom of the frame. The center portion of the frame 16 is attached to a transverse axle assembly rotatably carrying a pair of wheels 24. The axle assembly 23 may be any axle unit including a unit with suitable springs to provide the trailer with cushioning. Mounted on frame 16 is a trailer body indicated generally at 27 having a generally horizontal floor 28 secured to the frame. Mounted on the frame adjacent the floor 28 are box shaped wheel cover housings 29 and 31 which enclose the upper portions of the wheels 24. The housings 29 and 31 have flat upright inside walls and end walls and generally horizontal flat top walls.

Projected upwardly from the corners of the frame 16 are upright corner posts 32, 33, 34 and 35. Removably mounted on the frame are upright inside rear posts 37 and 39. Front inside posts 36 and 38 located in general transverse alignment with the front corner posts 32 and 33 are secured to front bulk head or wall 43. The rear inside posts 37 and 39 are in general transverse alignment with the rear corner posts 33 and 35 along the rear edge of the frame 16. As seen in FIGURE 4, the front corner posts 32 and 34 each have inwardly directed channels 41 and 42 respectively which removably carry front upright panel or bulk head 43. The bottom of the bulk head 43 resets on the floor 28. The top edge of the bulk head 43 is in general horizontal alignment with the top of the posts 32 and 34.

Referring to FIGURE 9, the inside post 39 comprises an upright channel mounted on a generally horizontal foot 44 secured to the floor 28 with a bolt assembly 46. The upper end of the post 39 is secured to a generally horizontal outwardly directed bar 47. The outer end of the bar 47 has a hook 48 which projects through a hole in the post 39 to releasably secure the upper end of the post 39 to the upper end of the post 35. Rear inside post 37 is mounted to floor and corner post 33 in a similar manner.

Returning to FIGURE 4, upright flat side walls or panels 49 and 51 extend between the inside posts 36, 37 and 38, 39 respectively. The ends of the panels are slidably accommodated in the facing U-shaped channels so that the panels may be removed from the trailer on upward movement. The panels are rectangular flat board members which divide the floor space into a central storage section indicated at 52 and separate elongated side sections 53 and 54.

The end of the body is closed with a generally flat rear end or tail gate 56 pivotally mounted on the corner posts 33 and 35. As shown in FIGURES 3 and 6, secured to the lower opposite portions of the gate 56 are outwardly directed pivot arms 57 and 58 which cooperate with upright brackets 59 and 61 respectively to pivotally mount the lower end of the gate on the rear corner posts 33 and 35. Secured to opposite upper portions of the gate 56 are latches 62 and 63 which cooperate with turnable screw eyes mounted on the posts to releasably lock the end gate 56 in an upright position to the posts 33 and 35. As shown in FIGURES 6 and 7, the end gate 56 is movable into a flat table or horizontal position. The mid-portions of the posts 33 and 35 carry brackets 64 having upwardly open recesses which accommodate the pivoting arms 57 and 58 to mount the lower end of the gate 56 to the posts. The outer end of the gate 56 is retained in the horizontal position by a pair of struts 66 which releasably engage clips 67 and 68 mounted on the rear end of the floor 28 and the gate 56 respectively.

As shown in FIGURES 4 and 11, corner posts 32 and 33 have upright facing channels 69 and 71 for selectively receiving the upright side wall 49. Posts 34 and 35 on the opposite side of the frame have similarly facing channels 72 and 73 selectively accommodating the upright side wall 51. The side walls 49 and 51 are of the same height as the posts. In this manner the cargo carrying area of the floor may be expanded to the full width of the trailer. As shown in FIGURE 11, when the side walls 49 and 51 are located in the outer positions they engage the outside portion of the wheel cover housings 29 and 31. This stabilizes the mid-sections of the side walls 49 and 51. In the same manner, when the side walls 49 and 51 are in the inner positions as shown in dotted lines in FIGURE 11, the ends of the panels are slidably accommodated in the channels 36, 37 and 38, 39 respectively. The mid-portions of the channels engage the flat inner wall of the housings 29 and 31.

Referring to FIGURE 4, there is shown a plurality of removable box units or cabinets 74, 75 and 76 located in the side section 53 adjacent the outside of side wall 49. Similar box units or cabinets 77, 78 and 79 are located in the side section 54 adjacent the outside of side wall 51. Upright transverse ribs or cleats 81, 82, 83 and 84 secured to the floor adjacent the ends of the wheel cover housings 29 and 31 fit into the false bottoms of the box units 74, 76, 77 and 79 to prevent these box units from moving laterally outward from the trailer.

The end box units 74, 76, 77 and 79 are identical in construction. The following description is limited to the box unit 77 as shown in FIGURE 6. Box unit 77 is an upright rectangular box having a side door 86 hinged to one side of the box. A key lock 87 is used to hold the door in the locked position. Located within the box are horizontal shelves 88 which divide the box into a plurality of article storing compartments. Secured to the top of the box is a pivoting flexible handle 93 providing a convenient hand grip for removing the box unit upwardly from the trailer.

The center box units 75 and 78 are elongated rectangular boxes which are identical in size and shape located on top of the wheel cover housings. The outside of the intermediate box has an alongated door 89 pivoted along the bottom to the box. A link 91 is used to hold the door 89 in the horizontal position when the door is open. The top portion of the door 89 has a key lock 92 which holds the door in the closed position. The intermediate box has a pair of handles 94 used to remove the box unit upwardly from the trailer.

Referring to FIGURE 10, box units 74 and 77 and side panel 49 are illustrated and set up as a bench or a table. Located in the bottom of the box units 74 and 77 are folding legs 95 which increase the height of the table. When the box units are located in the trailer, legs 95 are folded into the false bottom of the box units.

As shown in FIGURES 1 and 6, the top of the trailer body is closed with a cover indicated generally at 96 comprising a pair of hinged door members 97 and 98. Opposite outer portions of the door member 97 is hinged by pivot members 99 to the upper sections of the corner posts 34 and 35. In a similar manner pivot members 101 pivotally mount the door member 98 on the upper ends of corner posts 34 and 35. FIGURES 6 and 8 show each door member 97 and 98 enclosing approximately one-half of the trailer body so that both the center storage section 52 and the side sections 53 and 54 are covered. The covers when in the closed position have outside longitudinal edges which are contiguous to each other. Secured to the top of the outer edge of door member 97 is an angle member 102 having an upright longitudinal rib. Door member 98 has a longitudinal rib 103 extended parallel to the flange of the angle member 102. Secured to the rib 103 is an inverted L-shaped channel 104 which extends over the flange of the angle member 102 to close the space between the door members 97 and 98. Referring to FIGURE 3, the door members 97 and 98 are held in the closed position by a flexible loop 106 mounted on the mid-portion of the rear end gate 56 by a pair of retainers 107, as eye bolt screws. The door members 97 and 98 have projections 108 which provide holding members for the flexible loop whereby the flexible loop biases and holds the door members 97 and 98 in the closed positions.

As shown in FIGURES 5 and 6, the door members 97 and 98 may be pivoted to generally upright open positions providing unrestricted access to the interior of the trailer body. Struts 109 pivoted to the opposite ends of the door member cooperate with the tops of the corner posts to hold the door member in the open position. The struts prevent the accidental closing of the door members. Each door member has a plurality of transverse downwardly projected ribs 111 which reinforce the covering panels as well as provide stops located closely adjacent the tops of the box units when the cover members are closed. This minimizes jaring and moving of the box units in the trailer. The ribs 111 are joined to a downwardly projected peripheral flange 112 extended around the sides and the front door member. The mid-portion of the outer section of the peripheral flange 112 carries a block 113 which cooperates with a stop 114 on the top face of box unit 75 when the door member is closed to prevent the lateral outward movement of the box unit and yet permit the opening of the door so that the interior of the box unit 75 is accessible without removing the box unit from the trailer. Door member 97 has a similar block which cooperates with a stop on box unit 78.

As shown in FIGURE 11, the cover 96 has been removed from the trailer to convert the camping trailer to a general utility trailer. It is apparent that the cover member does not have to be removed in order to reposition the side panels 49 and 51 as shown in FIGURE 11 to enlarge the cargo carrying space of the trailer.

In use, the box units 74 are intitally loaded with the required camping gear, food, water, paper and the like. With the side walls 49 and 51 located between the inside posts 36, 37 and 38, 39 the trailer is divided into a center cargo storage section 52 and side sections 53 and 54. The box units are positioned in the side sections 53 and 54 with the doors of each box unit facing outwardly as shown in FIGURE 6. The bulky camping equipment, as chairs, tent and the like, are loaded in the center storage section 52. The rear end gate 56 is closed with the latches 62 and 63. The door members 97 and 98 swing down to their closed positions and retained there by the use of the flexible loop 106. The trailer is ready for the camping trip. The towing vehicle does not have to be loaded or unloaded thereby saving time and space.

At the camp site the tent in the cargo space is readily available for setting up. The box units 74 to 79 can be opened without removing them from the trailer. If desired, the box units can be removed from the trailer by lifting them upwardly. As illustrated in FIGURE 10, two box units 74 and 77 and a side member can be used as a bench or a table. The trailer provides a convenient place to store the camping equipment between camping trips and at the same time making the camping equipment available for immediate use.

When the trailer is used as a utility trailer, the box units are removed and the side panels are moved to their outer positions as shown in full lines in FIGURE 11. The two piece cover may be used or removed to form an open topped trailer. The tail gate 56 as well as the front bulk head 43 are removable to accommodate longer loads, as snowmobiles, pipes, lumber and the like.

While there has been shown and described a trailer illustrating the preferred embodiment of the invention there may be various changes, substitutions and additions made by those skilled in the art without departing from the spirit of the invention. For example, boat racks can be mounted on the door members to support a boat or canoe. The invention is defined in the following claims.

The embodiments of the invention in which an exclusive property or privilege is claimed are defined as follows:

1. A vehicle body comprising: a frame, a floor having a front end, rear end and opposite sides secured to the frame, first upright posts generally at each juncture of the ends and sides of the floor, second upright posts located generally at the ends of the floor between the first posts, and longitudinal upright side members extended between and selectively held by the first posts and the second posts whereby when the side members are retained by the first posts the floor is in one section, and when the side members are retained by the second posts the floor is divided into a central section and side sections.

2. The body of claim 1 including removable box units located on the floor adjacent the outsides of the side members when the side members are retained by the second posts, means on the floor preventing lateral outward movement of said box units whereby the box units are removable from the trailer body by lifting the box units upwardly out of the body.

3. The structure of claim 2 wherein at least one box unit has an outwardly opening door which can be opened when the box unit is located on the floor adjacent the side member.

4. The structure of claim 2 including cover means movably mounted on one of said posts for closing the top of said body.

5. The body of claim 1 including wheel covering housings on opposite sides of the floor, said side members located adjacent the inside of the wheel covering housings when supported by the second posts and located adjacent the outside of the wheel covering housings when supported by the first posts.

6. The body of claim 1 wherein each of said first posts and each of said second posts have upright channel members for accommodating opposite ends of the side members whereby the side members can be selectively held by the first posts and by the second posts.

7. The body of claim 1 including members releasably attaching the top portions of adjacent rear first posts and rear second posts and means releasably attaching the rear second posts to the floor whereby the rear second posts can be removed from the body.

8. The body of claim 1 including cover means movably mounted on the first posts for closing the top of the trailer body.

9. The structure of claim 4 wherein said cover means includes longitudinal side sections which prevent lateral removal of box units when the cover means is closed.

10. The body of claim 1 including an upright front wall, the front pair of said second posts being secured to the front wall.

11. The body of claim 1 including a rear tail gate pivotally mounted on the rear pair of first posts and mosts for selectively supporting the tail gate in a generally horizontal position.

References Cited

UNITED STATES PATENTS

| | | | |
|---|---|---|---|
| 3,245,713 | 4/1966 | Ogilvie | 296—24 |
| 2,978,153 | 4/1961 | Brindle | 296—24 X |
| 2,455,417 | 12/1948 | Holan | 296—24 |

PHILIP GOODMAN, Primary Examiner

U.S. Cl. X.R.

296—26